United States Patent

[11] 3,632,212

[72] Inventor G. Enrique Bernal
Minnetonka, Minn.
[21] Appl. No. 47,400
[22] Filed June 18, 1970
[45] Patented Jan. 4, 1972
[73] Assignee Honeywell Inc.
Minneapolis, Minn.

[54] GAS TEMPERATURE MEASUREMENT SYSTEM EMPLOYING A LASER
10 Claims, 1 Drawing Fig.

[52] U.S. Cl. ................................ 356/45,
73/355, 250/43.5 R
[51] Int. Cl. ................................ G01j 5/60,
G01k 11/00
[50] Field of Search ................................ 356/43, 50;
73/355; 250/43.5 R

[56] References Cited
UNITED STATES PATENTS
| | | | |
|---|---|---|---|
| 2,844,033 | 7/1958 | Tandler et al. | 73/355 |
| 2,212,211 | 8/1940 | Pfund | 73/355 |
| 3,462,224 | 8/1969 | Woods et al. | 356/43 |
| 2,871,758 | 2/1959 | Moutet | 73/355 |

Primary Examiner—Ronald L. Wibert
Assistant Examiner—V. P. McGraw
Attorneys—Lamont B. Koontz and Alan M. Staubly ABSTRACT: A system for measuring the temperature of gases in a region by determining the attenuation of light pulses of various frequencies has as its light source a laser having an active gas which is the same as one of the gases contained in the region, and having variable-frequency selective positive feedback.

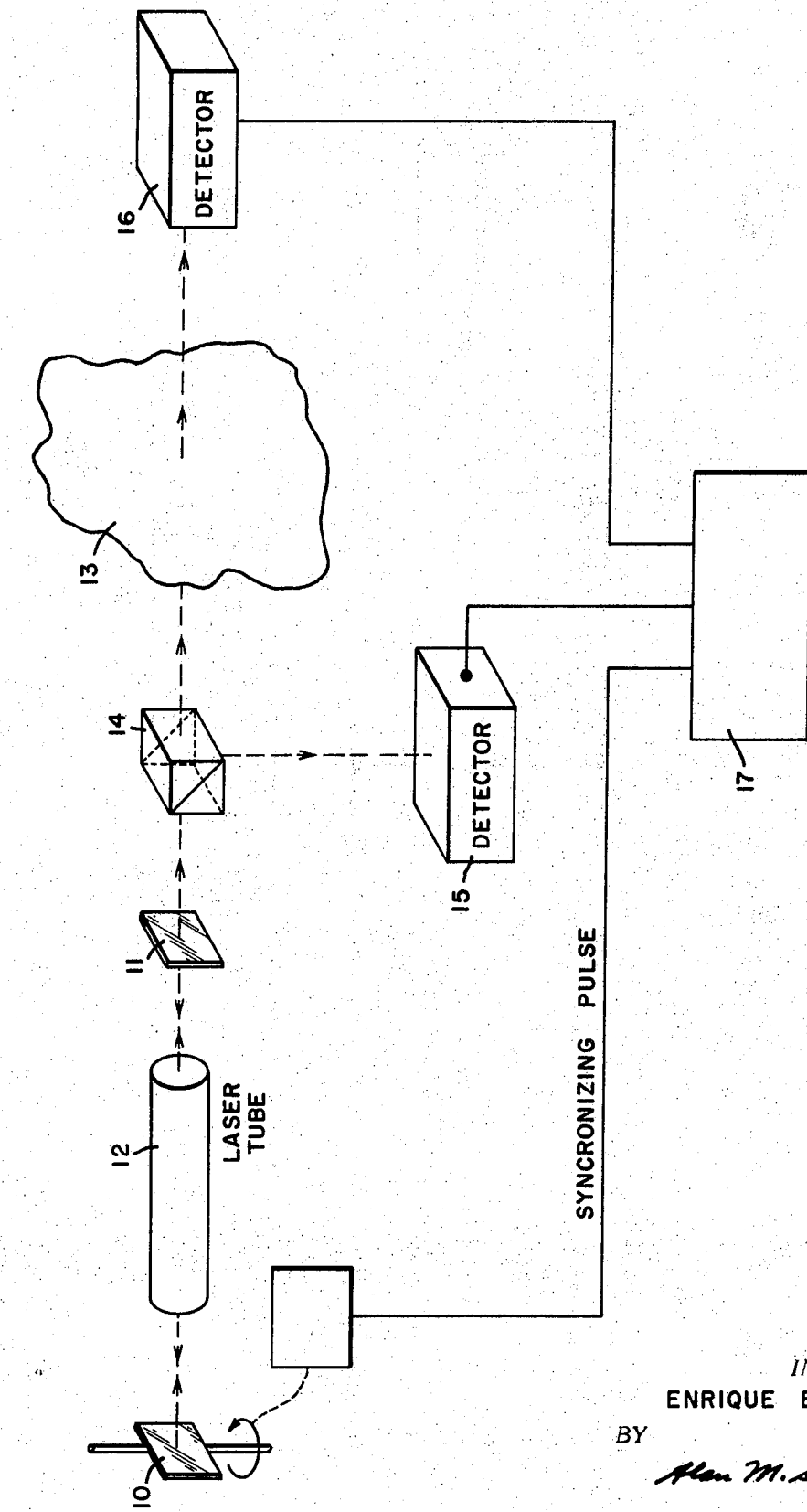

GAS TEMPERATURE MEASUREMENT SYSTEM EMPLOYING A LASER

BACKGROUND OF THE INVENTION

The measurement of the temperature of a combustion chamber or any other region containing high-temperature gases is difficult because the high-temperature gases normally cause destruction of a temperature probe. Therefore, it is desirable to have a temperature measurement system which does not require the positioning of probes within the chamber. One well-known method of temperature measurement of gases not requiring temperature probes is to determine the amount of absorption of various frequencies of light, and thereby determine the thermal excitation of the gas.

A gas molecule can exist in certain stationary states, each of which corresponds to a definite value of energy and is characterized by quantum numbers. Transitions between the stationary states may occur by the emission or absorption of energy as radiation. The frequency, $\nu$, of the radiation emitted or absorbed is defined by the Bohr frequency relation:

$$h\nu = E_n - E_i,$$

where $E_n$ and $E_i$ are energies of the states between which the transition takes place and "$h$" is Planck's constant.

If two frequencies, $\nu n$ and $\nu m$, represent transitions from a common lower level "$i$" to levels "$n$" and "$m$" respectively, then the ratio of absorption $\alpha_n/\alpha_m$, of the two frequencies is proportional to the ratio of the populations, $N_n$ and $N_m$ of levels "$n$" and "$m$." Thus, from a measurement of $\alpha_n$ and $\alpha_m$, the temperature is determined using Boltzmann's relation:

$$\alpha_n/\alpha_m = N_n/N_m = \exp{-(E_n - E_m)/kT}$$

where $E_n$ is the energy of level "$n$," $E_m$ is the energy of level "$m$," "$k$" is Boltzmann's constant, and "$T$" is the absolute temperature. Because temperature is determined by finding the ratio of the amount of absorption of two frequencies, the pressure, volume, velocity, and turbulence of gas do not affect the measurement. While two frequencies are all that is necessary to determine the temperature, the use of many frequencies increases the accuracy of measurement.

It is possible to produce monochromatic light of various frequencies by passing light from a conventional source through a monochromator. The spectral brightness of the light from the monochromator is rather low, which makes it necessary to place the detectors close to the medium being measured. This subjects the detectors to black body radiation from the medium, and due to their limited dynamic range, the detectors become saturated if the black body radiation, or noise, is greater than the signal. Since a black body source is commonly used as the conventional light source, the light from the monochromator is of comparable brightness to that radiated by the medium. To make a ratio measurement, it is necessary to limit the bandwidth of the signal, but the black body radiation from the medium is not so limited and has a much wider bandwidth. Therefore, a greater amount of energy constituting noise impinges on the detector than does energy from the signal. While putting a second monochromator in the system limits the black body radiation from the medium which impinges on the detector to the same bandwidth as that of the source, the two monochromators have to be synchronized in frequency with one another. Such a system is cumbersome and expensive.

SUMMARY OF THE INVENTION

This invention provides a system for measuring the temperature of a gas by determining the relative amounts of absorption of various frequencies of light. A laser having an active gas which is the same as the gas whose temperature is to be measured is the monochromatic light source. When frequency-selective feedback is varied, the laser generates pulses as the various characteristic frequencies of the active gas come successively into resonance. These pulses have frequencies which exactly correspond to those absorbed by the gas whose temperature is to be measured.

BRIEF DESCRIPTION OF THE DRAWING

The FIGURE is a schematic diagram of one embodiment of the present invention.

DESCRIPTION OF THE PREFERRED EMBODIMENT

The operation of a laser is based on the occurrence of a population inversion, that is, a condition in which the number of molecules, $N_n$, in state "$n$" is greater than the number of molecules, $N_1$, in state "1," even though $E_n$ is greater than $E_1$. The system is not in thermodynamic equilibrium, and radiates spontaneously. It also acts as an amplifier of radiation at the frequency which corresponds to a transition between energy state "$n$" and energy state "1."

The frequencies at which a laser oscillates are determined by both the characteristic frequencies of the amplifying medium and the ability of the cavity to supply positive feedback at those frequencies. For a given active gas possessing several characteristic frequencies, the characteristic frequency at which the laser oscillates can be determined by controlling the feedback at each frequency. Only that characteristic frequency for which positive feedback is supplied oscillates.

One method of obtaining such frequency-selective positive feedback is by varying the effective length of the resonant cavity of the laser. If the effective length of the resonant cavity is varied in a continuous manner, the laser emits pulses as the various characteristic frequencies of the active gas come successively into resonance.

Another means of providing frequency-selective positive feedback is by rotating a dispersive element, such as a diffraction grating or prism, as one reflective surface of the resonant cavity. For a given angle of the dispersive element with respect to the laser axis, only light of a frequency determined by the angle is reflected back into the cavity. Therefore, during one rotation of the dispersive element, each characteristic frequency comes successively into resonance as the dispersive element momentarily attains an angle which reflects that characteristic frequency into the cavity, and pulses are produced. The number of pulses produced in a given time is dependent upon the speed at which the dispersive element is rotated. If the speed of rotation is low, the pulses of light are sufficiently long to approximate continuous operation of the laser for the duration of the pulse. If, on the other hand, the speed of rotation is high, the laser is Q-switched, and produces pulses of very high power and very short duration. This high-speed method, known as sequential Q-switching, was described by N. Djeu et al. in the *Journal of Applied Physics*, Vol. 39, No. 4, Page 2,157, 1968.

If the active gas of the laser source is the same as the gas whose temperature is to be measured, the discrete frequencies which are produced by sequential Q-switching of the laser are exactly those partially absorbed by transitions of the gas. For example, if it is desired to measure the temperature of gases in a jet engine, a carbon dioxide laser can be used since carbon dioxide is present as a combustion product in the jet engine. In this case, frequencies which correspond to wavelengths between 4.5 and 10.6 microns can be employed. However, lasers having other active gases which are combustion products, such as the carbon monoxide laser can also be used.

Due to its resonant structure, the laser produces pulses of very narrow bandwidth and very high quality factor, Q. As a result, $CO_2$ laser emission lines have a narrower width than the corresponding absorption lines of the $CO_2$ in the combustion chamber, and any frequency produced by the $CO_2$ laser is partially absorbed by the $CO_2$ in the chamber.

Sequential Q-switching of the $CO_2$ laser makes it possible to sequentially produce at very high speed a large number of pulses having wavelengths characteristic of $CO_2$ exclusively. The high speed at which the pulses are produced allows many different wavelengths to be measured, and makes it possible to average the signal in a reasonable time to increase accuracy of measurement.

The laser produces pulses of very high brightness, making it possible to put the detector far away from the medium which is being measured. By placing the detector far from the chamber, the intensity of the black body radiation from the chamber which impinges on the detector is not comparable to that of the laser beam. Therefore, the signal-to-noise ratio of this system is greatly enhanced over that of prior art systems.

In one embodiment shown in the FIGURE, a rotating grating 10 and a partially reflective mirror 11 are the reflective surfaces which define the resonant cavity of the laser. The laser tube 12 contains the active gas, which is the same as the gas in region 13. A beam splitter 14 reflects a fraction of the light to detector means 15 and allows the rest of the light to pass through region 13. Second detector means 16 measures the intensity of the light after passage through the chamber, and electronic circuitry 17 compares the signals from the detectors at each of the various frequencies. A synchronizing signal is derived from the rotating grating to indicate the beginning of each revolution and thus make it possible to average the measurements over several revolutions. However, other arrangements of the elements are possible, as one skilled in the art would certainly realize.

The embodiments of the invention in which an exclusive property or right is claimed are defined as follows:

1. A system for determining the temperature of a region containing a gas having an energy level population depending on its thermal excitation, the system comprising:
    laser means comprising:
        an active gas which is the same as the gas in said region, and
        frequency-selective positive feedback means capable of varying the frequency at which positive feedback is supplied to the laser means, so as to cause the laser means to emit pulses of light having different frequencies, the frequency of each pulse being one which is partially absorbed by an energy level transition of the thermally excited gas, and
    means for determining the attenuation of the pulses of light having different frequencies caused by partial absorption thereof by the thermally excited gas.

2. The system of claim 1 wherein the means to determine the attenuation of the pulses of light comprises detector means to measure the intensity of the light pulses before and after passage through the region, means to electronically compare the two intensities at each of the various frequencies, and means for determining the frequency of each light pulse.

3. The system of claim 2 wherein the frequency-selective feedback comprises a rotating dispersive element as one reflective surface of the resonant cavity of the laser.

4. The system of claim 3 wherein the dispersive element is a diffraction grating.

5. The system of claim 3 wherein the dispersive element is a prism.

6. The system of claim 3 wherein the speed of rotation of said dispersive element is sufficient to sequentially Q-switch said laser means.

7. The system of claim 3 wherein the means for determining the frequency of each light pulse comprises means to produce a synchronizing electrical pulse when the dispersive element attains a reference angular orientation.

8. The system of claim 1 wherein the region containing a gas is a combustion chamber.

9. The system of claim 1 wherein the thermally excited gas and the active gas of the laser means is carbon dioxide.

10. The system of claim 9 wherein the wavelengths of the pulses of light are within a range of 4.5 to 10.6 microns.

* * * * *

UNITED STATES PATENT OFFICE
CERTIFICATE OF CORRECTION

Patent No. 3,632,212        Dated January 4, 1972

Inventor(s) Enrique Bernal G.

It is certified that error appears in the above-identified patent and that said Letters Patent are hereby corrected as shown below:

On the cover sheet [72] "G. Enrique Bernal" should read -- Enrique Bernal G. -- .

Signed and sealed this 15th day of May 1973.

(SEAL)
Attest:

EDWARD M. FLETCHER, JR.
Attesting Officer

ROBERT GOTTSCHALK
Commissioner of Patents